United States Patent [19]

Ellis

[11] 4,120,788
[45] Oct. 17, 1978

[54] OIL SLICK REMOVAL AND RECOVERY SYSTEM

[76] Inventor: Robert D. Ellis, P.O. Box 340, Flora, Ill. 62839

[21] Appl. No.: 799,213

[22] Filed: May 23, 1977

[51] Int. Cl.$^2$ ............................................. C02B 9/02
[52] U.S. Cl. .................................. 210/30 A; 210/40; 210/242 AS; 210/DIG. 26
[58] Field of Search .......... 210/30 A, 36, 40, 242 AS, 210/DIG. 26, 198 R

[56] References Cited

U.S. PATENT DOCUMENTS

| | | | |
|---|---|---|---|
| 3,518,183 | 6/1970 | Evans | 210/40 |
| 3,617,552 | 11/1971 | Will et al. | 210/30 A |
| 3,723,307 | 3/1973 | Hunter | 210/40 |
| 3,800,950 | 4/1974 | Hess et al. | 210/242 AS |
| 3,819,514 | 6/1974 | Clampitt et al. | 210/40 |
| 3,844,941 | 10/1974 | Jones | 210/DIG. 26 |
| 3,886,067 | 5/1975 | Miranda | 210/40 |
| 3,888,766 | 6/1975 | De Young | 210/40 |

Primary Examiner—Charles N. Hart
Assistant Examiner—Ivars Cintins
Attorney, Agent, or Firm—Cohn, Powell & Hind

[57] ABSTRACT

This system provides a method by which oil slicks are contained, removed and recovered from a water surface by providing a layer of sorbent material, such as foam, under the oil slick and above the oil slick to sandwich the oil. A foam spreading apparatus is provided which includes a floating boom attached to a towing vessel, the boom having spreader units disposed above and below the oil slick to discharge the foam forming a sandwich for the oil slick. The apparatus includes a harvesting vessel for cutting and shredding the foam sandwich and a recovery vessel for separating the oil from the strips.

20 Claims, 8 Drawing Figures

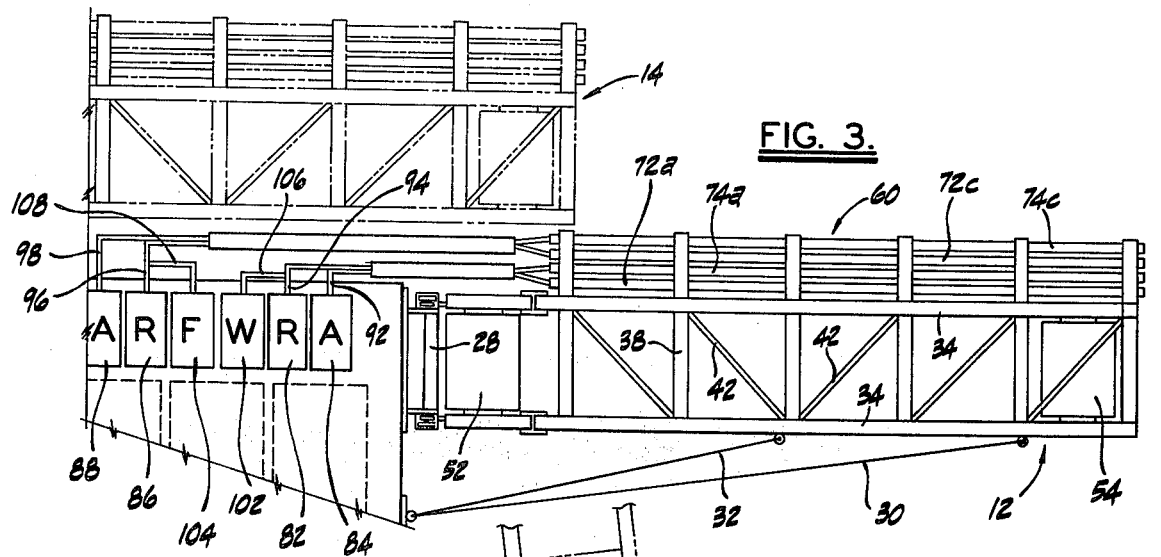
FIG. 3.
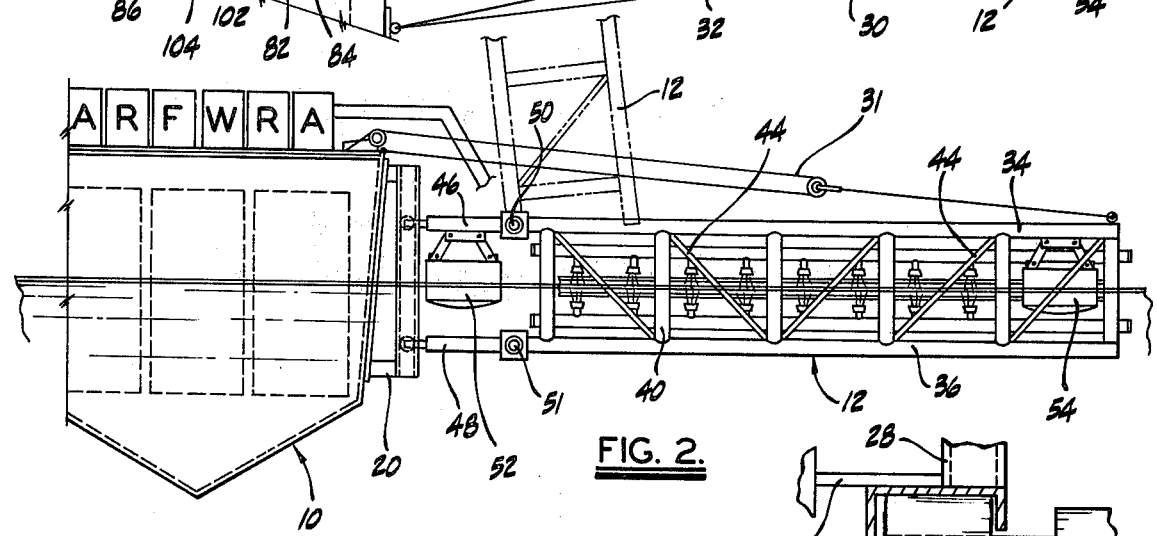
FIG. 2.
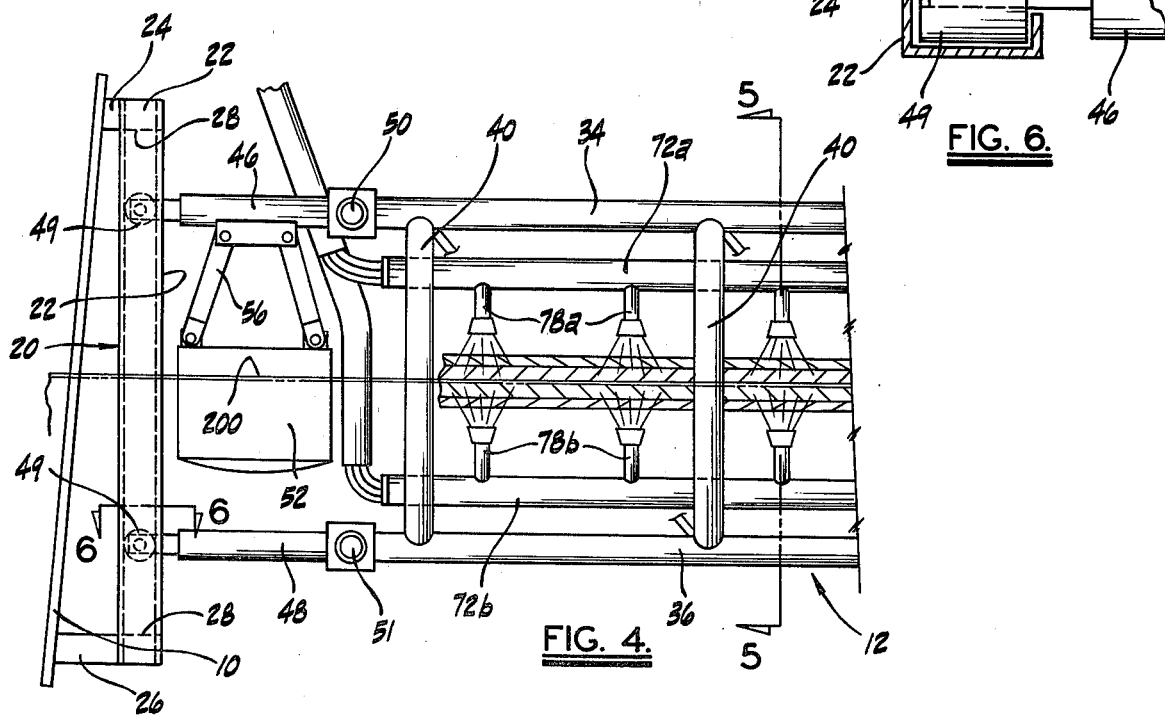
FIG. 6.
FIG. 4.

OIL SLICK REMOVAL AND RECOVERY SYSTEM

BACKGROUND OF THE INVENTION

This invention relates generally to a system for containing and recovering oil spills and particularly to a system which employs oil sorbent material.

The advent of the oil super tanker in World Trade has drawn attention to the need for an effective clean-up system for the oil spills which occur with increasing frequency from such tankers. Such oil spills reach catastrophic proportions in those instances in which such tankers are damaged or run aground, as was the case with the Argo Merchant carrying more than 7.5 million gallons of thick heating oil. Of course, in addition to the enormous clean-up problem there is also the related problem of the waste of a valuable natural resource. In addition to the formation of oil slicks resulting from damaged oil tankers there is also the possibility of even greater catastrophes resulting from the blow-out of oil rig systems such as occured in the North Sea off the coast of Norway in April of 1977. Such wells can discharge into the ocean one million gallons per day of oil and often many days elapse before the wells are capped. Some authorities are so fearful of the occurrence of oil spills of this type that off-shore drilling for oil is prohibited by them with the resultant loss of untold quantities of oil which is recognized as being the dominant natural fuel currently available. It goes without saying that the disastrous effect of oil spills on sea life together with the severe pollution of beaches has resulted in the solution to this problem being given the utmost priority.

In spite of the urgency, attempts to contain, remove and recover oil from the surface of the oceans of the world have not met with significant success. One of the methods employed has been the attempt to encircle the oil slick resulting from the spill with a peripheral inflated boom that contains the oil and then pump off the oil. This method suffers from the disadvantage that water as well as oil must be pumped and then separated, and the method cannot be employed satisfactorily in heavy seas. Another method, which has obvious disadvantages, has been the attempt to burn the oil off the water surface: this is a solution which may produce a pollution problem greater than that which it attempts to solve. Another attempted solution has been the use of synthetic foam to absorb the oil, which can then, in theory, be recovered from the impregnated foam. Two patents, namely U.S. Pat. No. 3,819,514 issued to Clampitt et al. and U.S. Pat. No. 3,886,067 issued to Miranda, disclose methods of utilizing foam for the removal of oil slicks. Both systems rely on the application of foam to the upper surface of the oil slick and appear to rely on the use of a particular type of foam. In the Clampitt system the foam is preformed and applied as chips or blocks to the upper surface of the water by means of a blower from an aircraft or from a vessel. The Miranda system, in one of its embodiments, delivers separate streams of foam-forming liquid through nozzles carried by a vessel high above the water surface. Such liquid streams rely on favorable wind and smooth seas to provide an even mix of the foam forming agents.

The present system solves the above and other problems in a manner not suggested in the known prior art.

SUMMARY OF THE INVENTION

This invention provides a method of containing and removing oil slicks from a water surface in a manner which renders the oil susceptible to recovery and can be carried out in weather conditions which do not permit recovery by any other known method.

The method of removing oil from the water surface comprises the steps of forming a layer of oil sorbent material below the oil, allowing said layer to contact the oil on the surface to sorb the oil, and removing the oil impregnated layer from the water.

This method of removing oil from the water surface comprises the steps of forming a layer of oil sorbent material below the oil and above the oil to cooperate in the forming of a sandwich of oil sorbent material which contacts and sorbs the oil, and removing the oil-impregnated sandwich of sorbent material from the water.

The method includes the use of foam as the oil sorbent material to form a foam sandwich.

The method includes the steps of forming a second sealer layer below the lower sorbent layer and a second sealer layer above the upper sorbent layer, said upper and lower second layers having a different density from said first foam layers.

The method includes the steps of removing the oil from the foam layers by cutting the foam sandwich into elongate strips, shredding said elongate strips and separating the oil therefrom.

This invention includes apparatus for removing oil from a water surface which comprises a spreader vessel, a supply of oil sorbent material, and boom means attached to the vessel, said boom means carrying spreading means, adapted to form an oil sorbent layer below the oil surface.

The apparatus includes a spreading means adapted to form an oil sorbent layer above the oil surface which cooperates with the sorbent layer below the water surface to form an oil sorbing sandwich.

The boom means carries a second spreading means adapted to form a sealer layer above and below the sorbent layers.

The boom means includes a plurality of upper and lower foam spreader units disposed in adjustably spaced vertical relation from each other.

The method and apparatus are relatively inexpensive to use and manufacture and can be used under extremely adverse weather conditions to provide effective removal and recovery of the oil.

BRIEF DESCRIPTION OF THE DRAWINGS

FIG. 2 is a front elevational view of the towing vessel and the side spreader boom;

FIG. 3 is a fragmentary plan of the rear portion of said towing vessel and side and rear spreader booms;

FIG. 4 is an enlarged fragmentary detail of a side spreader boom;

FIG. 6 is an enlarged cross-sectional detail of the side spreader boom roller assembly taken on line 6—6 of FIG. 5;

DESCRIPTION OF THE PREFERRED EMBODIMENT

Figure 1:
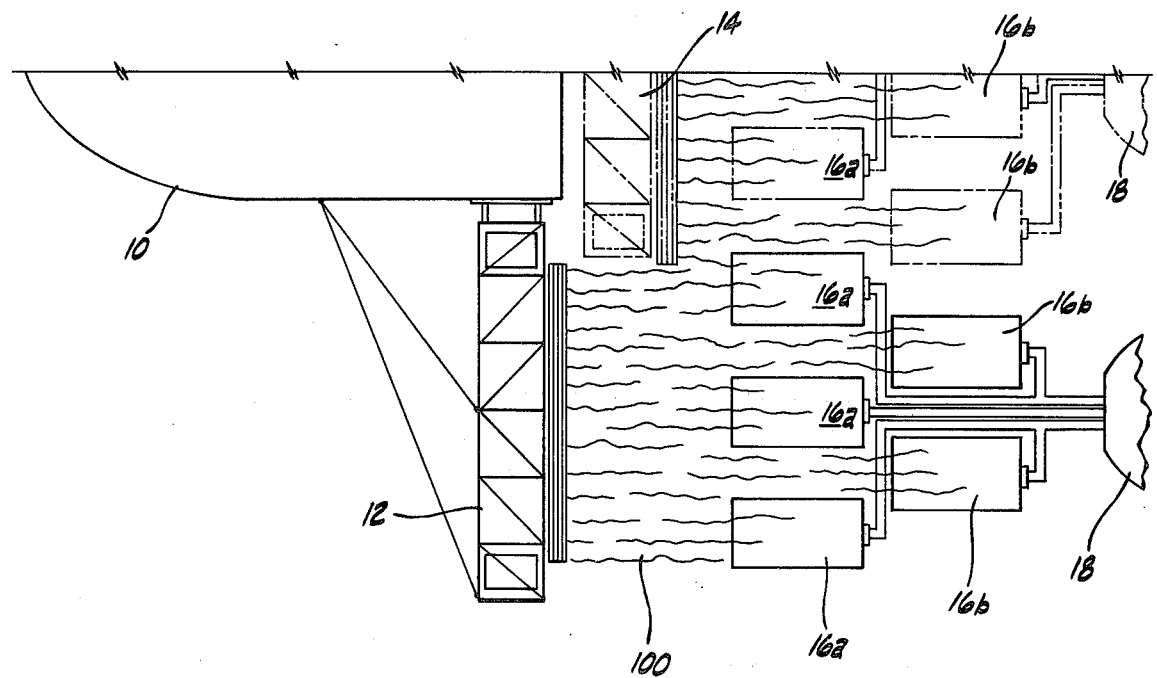
FIG. 1 is a schematic of the system illustrating the operational arrangement of the towing vessel with spreader booms attached, used in conjunction with harvesting and recovery vessels.

Referring now by reference numerals to the drawings and first to FIG. 1, it will be understood that the oil spill removal and recovery system of the preferred embodiment includes a spreader vessel 10 having a side spreader boom 12 and a rear spreader boom 14, which spread foam material generally indicated by numeral 100 and constituting an oil sorbent material above and below the oil slick. The system includes a plurality of harvesting vessels 16a and 16b, which gather and shred the oil impregnated foam material and recovery vessels 18 which are supplied with the shredded oil impregnated foam material for processing and oil separation recovery. These components of the system will now be more specifically described commencing with the towing spreader vessel 10 and particularly the side spreader boom 12 with reference to FIGS. 2 through 6.

As shown in FIG. 2, the spreader vessel 10 is provided with a side support structure 20 to which the side spreader boom 12 is attached. The support structure 20 includes a pair of vertical members 22 attached to the side of the towing vessel 10, as by upper and lower brackets 24 and 26 respectively, said vertical members 22 being connected by upper and lower cross members 28. This support structure 20 provides a means of connecting the side spreader boom 12 to the towing vessel 10 in conjunction with stays such as those indicated in FIG. 3 by numerals 30 and 32, said stays being connected to the end and intermediate portions of the spreader boom 12 respectively.

The spreader boom 12 in the preferred embodiment comprises a pair of upper members 34 and lower members 36 connected by upper and lower cross members 38, and side cross members 40. The boom 12 is stiffened longitudinally by diagonal braces 42 and 44 respectively and transversely by cross members 45. At its inner end the boom 12 includes a pair of upper link members 46 and lower link members 48. The upper and lower link members 46 and 48 are provided, as shown in FIG. 6, with end roller elements 49 which ride within the associated vertical member 22 said member providing a track. The upper and lower link members 46 and 48 are substantially similar except that the lower link member 48 is connected to the boom member 36 by means of a removable pin connection 51, which permits the bottom to be raised about the upper connection 50, as shown in phantom outline in FIG. 2, to facilitate the transportation thereof. When the boom is not in operation it is raised into a storage condition by a cable system 31. The boom 12 is provided with inner and outer pontoons 52 and 54, which are connected to the boom 12 as by supports, generally indicated by numeral 56. The pontoons 52 and 54 permit the boom 12 to be disposed, relative to the oil slick indicated by numeral 200, such that part of the boom is above and part of the boom is below said oil slick. It will be understood that, as the boom 12 moves vertically, in response to the fall and swell of the water, the end rollers 49 permit vertical movement of the pontoon supported boom by moving in the support members 22.

Figure 5:
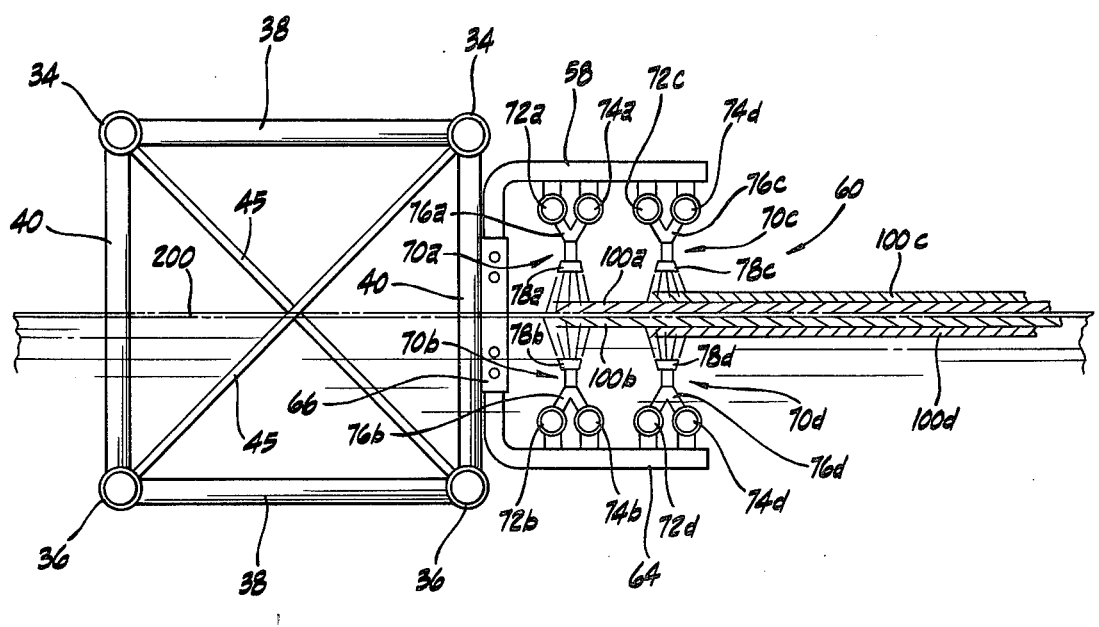
FIG. 5 is a cross-sectional view taken on line 5—5 of FIG. 4 illustrating the foam spreading units.
Figure 8:
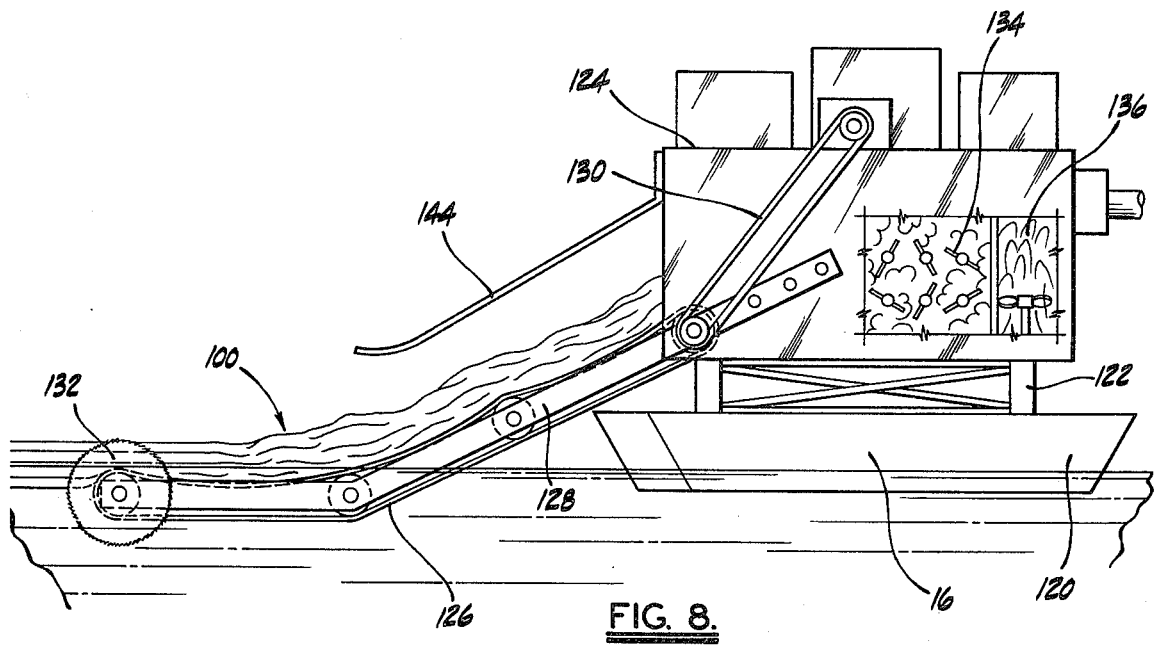
FIG. 8 is a sectional view through a harvesting vessel taken on line 8—8 of FIG. 7.

Importantly, as best shown in FIG. 5, the boom 12 includes a rear support structure generally indicated by numeral 58 which carries a foam spreader assembly generally indicated by numeral 60. The support structure 58 includes a plurality of substantially L-shaped upper members 62 and lower members 64 which, in the preferred embodiment, are movable relative to each other. Such relative movement is accomplished by the provision of an intermediate member 66 attached to the boom vertical cross members, to which the vertical legs of the L-shaped members are telescopically related. By this means it will be understood that the members 62 and 64 may be moved vertically relative to each other to control the distance of each from the oil slick 200 on the water surface. The foam spreader system 60 includes upper and lower spreader units 70a and 70b constituting a first stage and upper and lower spreader units 70c and 70d constituting a second stage. The units are substantially identical with respect to their component parts and will be described with respect to the first upper spreader unit 70a, it being understood that the same reference numeral designates the same part for the other spreader units 70b, 70c and 70d, with the addition of the appropriate suffix letter b, c and d respectively. Spreader unit 70a consists essentially of a pressurized resin supply line 72a and a pressurized foaming agent supply line 74a which are connected as by a junction 76a to a nozzle, or spray head 78a constituting a discharge portion of the foam spreader system. As shown in FIG. 3, the lines 72a and 72b are supplied with resin from a supply tank 82 via flexible conduit 92, and lines 74a and 74b are supplied with foaming agent from a supply tank 84 via conduit 94. In a like manner lines 72c and 72d are supplied with resin from tank 86 via flexible conduit 96, while lines 74c and 74d are supplied with foaming agent from tank 88 via conduit 98.

In those instances in which water and freon are to be mixed with the resins and foaming agents these are supplied from tanks 102 and 104 respectively, said water and freon being mixed prior to the foaming stage in the well known manner as by conduits 106 and 108 respectively.

In the preferred embodiment two foaming stages are used each provided by a different type of foam. The first foaming stage, which is provided by the leading upper and lower spreader units 70a and 70b, forms upper and lower foam layers 100a and 100b respectively. This foam is of the type known commercially as Rapco foam and is a modified urea formaldehyde resin, having the physical properties listed below in Table 1. This foam provides a sandwich in direct contact with the oil slick and its primary purpose is to soak up and contain the oil. Rapco foam is made up of two equal parts of resin and foaming agent having a relatively small proportion of water added and has characteristics which enable it to rise and float to the water surface.

It has been found that in some instances there is an advantage in adding a second relatively thin layer of another foam to the upper and lower surfaces respectively of the Rapco foam which will assist in flotation and, in addition, act as a sealer. This second stage foam is of a type known commercially as UFC-415 Froth and is a low viscosity, halocarbon blown polyurethane foam having the physical properties listed below in Table 2. UFC-415 Froth is mixed from two equal parts of resin and foaming agent plus R12 freon and is of the type used in raising sunken vessels. The density can be changed by adjusting the R12 freon content. In the preferred embodiment, assuming a 2 inches thick oil slick, the Rapco foam upper and lower layers are 1 inch and 2½ inches in thickness respectively, while the UFC-415 Froth upper and lower layers are both ½ inch in thickness.

Table 1

RAPCO FOAM

| Property | ASTM Test Method | Value |
|---|---|---|
| Thermal Conductivity: at 70° F K factor | | 0.2 |
| R factor | | 5.0 |
| | C177-63 | |
| at 35° F K factor | | 0.18 |
| R factor | | 5.5 |
| (1) Density lbs/cu.ft. | | |
| Standard | | 0.7 |
| Fresh Weight | | 2.5 |
| (2) Linear Shrinkage, Normal % | | 1.8–3 |
| Moisture Absorption, 24 hours in Wet Cavity Wall, % by weight | E96-66 Proced.B | 2.0 |
| Water Vapor Transmission, 24 hours in Wet Cavity Wall, perms | C355 | 32–38 |
| (3) Combustibility, Noncombustible Below ° F | E136-65 | 1208 |
| Surface Burning characteristic (foam exposed) | E84-70 | |
| Flame Spread | | 25 |
| Smoke Density | | 0–5 |
| Fuel Contributed | | 10 |

(1) Density can be varied from 0.6 to 1.0 lbs./ft.$^3$
(2) Rapid or forced drying may cause shrinkage in excess of 3 per cent; slow drying will hold shrinkage to 1.8 per cent or
(3) 1208° F heat causes material to decompose, releasing water vapors and, from a 2-gram sample in 5 cu. ft. cavity, 177 parts per million CO, 52 ppm HCHO, 7 ppm HCN, 59 ppm NH3 and 8 ppm NO$_2$.

Table 2

UFC-415 FROTH

| Property | ASTM Test Method | Value |
|---|---|---|
| Nominal Density lbs/cu.ft.(70° F) | | |
| Without R-12 | D1622 | 2.0 |
| With 3% R-12 | D1622 | 1.8 |
| With 6% R-12 | D1622 | 1.5 |
| Closed Cell Content % | D1940 | 92.0 |
| K Factor: Initial, BTU/ft$^2$hr. ° F/in.(70° F) | C177 | 0.12 |
| : Aged BTU/ft$^2$ hr.° F/in.(70° F) | C177 | 0.14 |
| Compressive Strength Without R-12,psi (70° F) | | 30.0 |
| Tensile Strength Without R-12,psi(70° F) | | 42.0 |
| Shear Strength Without R-12,psi(70° F) | | 28.0 |
| Flammability Characteristics | E84 | Value |
| Flame Spread | | non-rated |
| Smoke Developed | | non-rated |
| Water Absorption lbs/sq.ft. | | 0.03 max |
| Water Vapor Transmission,perm-inches | | 2.2 |
| Dimensional Stability % Volume Change | | |
| 4 Weeks at 158° F, 100% RH | | +8% |
| 4 Weeks at 0° F | | −8% |
| 4 Weeks at 180° F | | +8% |

In those instances in which a wider sweep of the oil slick is desired a rear spreader boom 14 is used, as shown in phantom outline in FIGS. 1 and 3, together with another side spreader boom 12 (not shown). The rear spreader boom 14 is supported on end pontoons and is towed behind the spreader vessel 10. In other respects it is of similar construction to the side spreader booms 12 as shown in FIG. 5.

Figure 7:
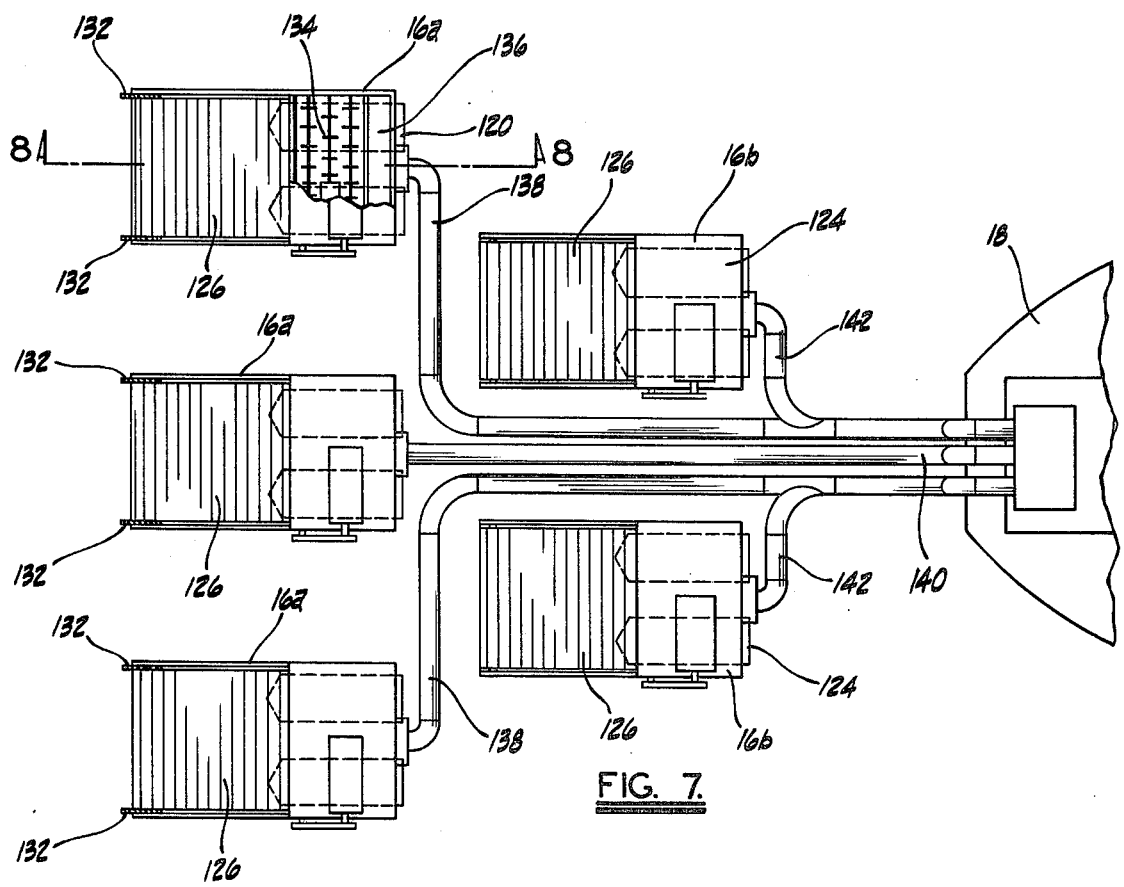
FIG. 7 is an enlarged plan illustrating the harvesting and recovery vessels.

The double foam layer is processed by the harvesting system which is best shown in FIGS. 6 and 7.

The harvesting system includes a plurality of front vessels 16a and a plurality of rear vessels 16b. In the preferred embodiment each vessel is formed from a pair of pontoons 120 interconnected by a superstructure 122. A processing center 124 is carried above the superstructure 122 and a chain link conveyor 126 is mounted forwardly of the processing center said conveyor being carried by cantilever support arms 128. The chain link conveyor 126 is driven by a drive assembly generally indicated by numeral 130 and the front vessels 16a each includes a pair of circular saws 132 at the remote end. The saws 132 cut the foam sandwich into an elongate strip and feed said strip into the interior of the processing center 124, first into a chopper chamber 134 having a plurality of motor driven blades for shredding said foam strip into smaller pieces annd then into a blower chamber 136 from which it is passed through a conduit 138 to the recovery vessel 18 where compression rollers or similar means separate the oil from the shredded foam and store the separated materials. It will be understood from FIG. 7 that the harvesting system provides a plurality of forward units and a plurality of rearward units which overlap the gaps between the forwardly spaced units. The rearwardly spaced units are identical with the forwardly spaced units except that they do not require the circular saw blades. The material is transferred to the recovery vessel from the center forward unit by conduit 140 and from the rear units by conduits 142 which connect with conduits 138. It will be understood that the harvesting vessels 16a and 16b can be braced together if necessary to insure that the forward and rearward spacing is maintained and that said vessels can readily be propelled by the attachment to the recovery vessel 18 or alternatively can be self propelled.

It is thought that the structural features and functional advantages of this oil recovery system have become fully apparent from the foregoing description of parts but for completeness of disclosure the operation of the system will be briefly described.

The harvesting vessels 16a and 16b are disposed some 400 to 500 feet behind the spreader boom 12 and in the preferred embodiment are pushed by the recovery vessel 18. The overlapping relationship of the front and rear harvesting vessels 16a and 16b provides that a total width equivalent to the foamed width spread by the spreader booms 12, in the case of a single boom, is completely taken up and processed by the forwardly and rearwardly disposed vessels consecutively. Depending on the particular size and thickness of the oil spill the spreader vessel 10 and the harvesting and recovery vessels 16 and 18 can be moved in straight passes back and forth across the oil slick.

A preferred procedure, in the case of an oil spill of some thickness, is to encircle the periphery of the spill as quickly as possible discharging the foaming materials to form a foam sandwich ring. Succeedingly smaller, generally concentric rings can then be formed. When the spreader vessel has completed its second ring the harvesting and recovery vessels can be moved in and remove the first ring so that a complete ring is always enclosing the oil slick.

It will be understood that the system, which provides in particular for a layer of oil sorbent material to be formed underneath the oil spill, can be used even in those situations in which the oil has formed into pancakes and has sunk a considerable distance, even several feet, below the water surface and is therefore otherwise inaccessible to conventional methods.

The upper and lower spreader units 70a, 70b and 70c, 70d are disposed from each other in adjustably spaced relation so that the system can operate even in swells of considerable magnitude. Typically, the adjustment will be from 4 feet to 12 feet which will permit foam to be formed at a considerable distance below the surface of the oil. It will be understood that the scope of the system is considerably increased if two side boom spreaders 12 are used together with a tail boom spreader 14 and associated harvesting and recovery vessels. The use of a single boom structure which is towed behind the vessel 10 and extending on either side thereof rather than being attached directly to it is also an alternative possibility. It will also be understood that the system is not limited to the use of foam but can be used with other oil sorbent materials which are discharged below the oil slick.

In any event a spreader having an overall length of 250 feet and a speed of approximately 7 knots will, it is anticipated, be able to cover one square mile of water surface in under three hours. The oil gathering potential depends, of course, on the thickness of the oil and would be in the vicinity of 700,000 barrels for this period of time with an oil slick of 2 inches in thickness. A 2 inch thickness of oil is an ideal thickness for recovery at optimum cost efficiency and it will be understood that the cost efficiency of recovery will vary with the thickness of the oil.

I claim as my invention:

1. A method of removing oil from a water surface comprising the steps of:
   (a) forming a layer of floatable oil sorbent material below the oil,
   (b) allowing said layer to rise and contact the oil under-surface to sorb the oil, and
   (c) removing the oil impregnated layer from the water.

2. A method of removing oil from a water surface as defined in claim 1, including the additional step of:
   (d) forming another layer of oil sorbent material above the oil to cooperate with the lower layer to form a floating oil sorbent sandwich.

3. A method of removing oil from a water surface comprising the steps of:
   (a) forming a floatable, oil sorbent foam layer below the oil,
   (b) forming a floatable, oil sorbent foam layer above the oil to cooperate with the first layer to form a floating foam sandwich,
   (c) allowing the foam layers to contact the oil under and upper surfaces to absorb the oil, and
   (d) removing the oil impregnated foam sandwich from the water.

4. A mether of removing oil from a water surface as defined in claim 3, including the additional step of:
   (e) forming a second floatable foam layer below the lower foam layer having a different density than said lower foam layer and providing a sealer.

5. A method of removing oil from a water surface as defined in claim 4, in which:
   (f) the first foam layer has a density of substantially 0.50 to 1.0 pounds per cubic foot, and
   (g) the second foam layer has a density of substantially 1.0 to 1.50 pounds per cubic foot.

6. A method of removing oil from a water surface as defined in claim 4, including the additional step of:
   (f) forming a second floatable foam layer above the upper foam layer having a different density than said upper foam layer and providing a sealer.

7. A method of removing oil from a water surface as defined in claim 3, including the additional step of:
   (e) removing the oil from the foam layers of the oil impregnated foam sandwich.

8. A method of removing oil from a water surface as defined in claim 3, including the additional step of:
   (e) cutting the oil impregnated foam sandwich into elongate strips to facilitate harvesting and oil removal, and
   (f) removing the oil from said strips.

9. A method of removing oil from a water surface as defined in claim 3, in which:
   (e) cutting the oil impregnated foam sandwich into elongate strips to facilitate harvesting and oil removal,
   (f) shredding the elongate strips to further facilitate oil removal, and
   (g) removing the oil from the shredded strips.

10. Apparatus for removing oil from a water surface comprising:
    (a) a vessel,
    (b) a supply of floatable oil sorbent material, and
    (c) boom means attached to said vessel, said boom means carrying sorbent material spreading means having a discharge portion disposed below the oil and adapted to foam a layer of floatable sorbent material below the oil.

11. Apparatus as defined in claim 10, in which:
    (d) said boom means carries sorbent material spreading means having a discharge portion disposed above the oil and adapted to form a layer of floatable material above the oil and cooperate with said lower layer to form an oil sorbent sandwich.

12. Apparatus for removing oil from a water surface comprising:
    (a) a vessel,
    (b) a supply of floatable oil sorbent foam, and
    (c) boom means attached to said vessel, said boom means carrying foam spreading means having a discharge portion disposed below the oil and adapted to form an oil sorbent foam layer below the oil and foam spreading means having a discharge portion disposed above the oil and adapted to form an oil sorbent foam layer above the oil said layers cooperating to form a foam sandwich for the oil.

13. Apparatus as defined in claim 12, in which:
    (d) a supply of floatable sealing foam is provided, and
    (e) the boom means carries a second foam spreading means having a discharge portion disposed below the oil and adapted to form a seal layer below the first lower foam layer.

14. Apparatus as defined in claim 13, in which:
    (f) the boom means carries a second foam spreading means having a discharge portion disposed above the oil and adapted to form a seal layer above the first upper foam layer.

15. Apparatus as defined in claim 12, in which:
    (d) oil removing means is provided for removing the oil from the foam layers of the oil impregnated foam sandwich.

16. Apparatus as defined in claim 12, in which:
    (d) foam cutting means is provided for cutting the oil impregnated foam sandwich into elongate strips to facilitate harvesting and oil removal, and
    (e) oil removing means is provided for removing the oil from the foam strips.

17. Apparatus as defined in claim 12, in which:
    (d) foam cutting means is provided for cutting the oil impregnated foam sandwich into elongate strips to facilitate harvesting and oil removal,
    (e) shredding means is provided for shredding the elongate strips to further facilitate removal of oil, and
    (f) oil removing means is provided for removing the oil from the foam strips.

18. Apparatus as defined in claim 12, in which:

(d) said foam spreading means include a plurality of upper and lower vertically spaced foam nozzles operatively carried lengthwise of the boom means in elevationally adjustable relation thereto, said upper and lower nozzles being respectively disposed in adjustably spaced relation above and below the oil.

19. A method of removing oil from a water surface comprising the steps of:
   (a) forming a floatable, oil sorbent foam below the oil, and
   (b) allowing said foam to rise and contact the oil undersurface to sorb the oil.

20. Apparatus for removing oil from a water surface comprising:
   (a) a vessel,
   (b) a supply of floatable oil sorbent foam, and
   (c) boom means attached to said vessel, said boom means carrying a plurality of foam spreading nozzles disposed lengthwise of the boom means at an elevation below the oil and connected to the foam supply to form foam below the oil.

* * * * *